United States Patent [19]

Affleck

[11] Patent Number: 4,751,713
[45] Date of Patent: Jun. 14, 1988

[54] GAS LASER HAVING A PIEZOELECTRIC FAN

[75] Inventor: Wayde Affleck, El Segundo, Calif.

[73] Assignee: Hughes Aircraft Company, Los Angeles, Calif.

[21] Appl. No.: 79,975

[22] Filed: Jul. 31, 1987

[51] Int. Cl.$^4$ .............................................. H01S 3/22
[52] U.S. Cl. ..................................... 372/59; 372/55; 372/98; 372/58
[58] Field of Search ....................... 372/55, 58, 98, 59, 372/61, 83, 65

[56] References Cited

U.S. PATENT DOCUMENTS 4,325,033  4/1982  Shutt ..................................... 372/58
4,672,620  6/1987  Slusher et al. ........................ 372/58

Primary Examiner—Leon Scott, Jr.
Attorney, Agent, or Firm—Ronald L. Taylor; V. G. Laslo; A. W. Karambelas

[57] ABSTRACT

A piezoelectric fan is comprised of two counter-oscillating flexible blades that are driven at resonance by a bimorph comprised of two piezoceramic bending elements. The fan is provided within the flow duct of a circulating gas laser. The operation of the piezoelectric fan serves to create a flow of a laser gas medium in a desired direction through the flow duct, thereby replenishing the gas medium between a pair of laser electrodes. The fan has no wearing elements, such as bearings, and requires no bearing lubricant resulting in the elimination of lubricant hydrocarbon and bearing particulate contamination of the laser gas medium.

9 Claims, 1 Drawing Sheet

GAS LASER HAVING A PIEZOELECTRIC FAN

FIELD OF THE INVENTION

The present invention relates to gas lasers and, in particular, relates to a piezoelectric fan for circulating and replenishing the gas medium within the laser.

BACKGROUND OF THE INVENTION

Gas lasers, such as transversely excited gas lasers, which are operated at moderate to high pulse repetition rates require a means of recirculating the gas medium within the laser housing in order to replenish the gas medium within the discharge region. Previous methods of recirculating the gas have typically relied on various types of fans. These various types of fans have included tangential, vaneaxial and centrifugal blowers. One common characteristic of all of these fan types is the requirement of bearings which hold the fan in place while allowing the rotation of the fan at high speeds. These fans are typically employed within the laser housing itself, in order to recirculate the gas medium through the housing and, hence, through the discharge region between a pair of opposed laser electrodes. The ation of the recirculating fan serves to replenish the gas medium between successive electrode discharges, thus providing for a fresh supply of gas medium for each pulse.

The aforementioned bearings incorporated within these fans introduce a significant problem into the operation of such a laser, especially in the sealed type of recirculating gas laser. This problem is related to the requirement that the fan bearings include some type of lubrication in order to reduce the bearing friction. Inasmuch as the fan is within the sealed laser housing, the laser gas comes into contact with the bearing lubrication, thereby resulting in the contamination of the laser gas medium by the lubricant. Bearing particulate matter may also contaminate the gas medium. For those lasers which have an extended operational lifetime such a contamination of the laser gas medium may result in undesirable operating characteristics of the laser or the complete failure of the laser. This contamination of the gas medium has also been found to occur during the storage of such lasers during periods of nonuse.

Rotating fans also introduce other problems when employed in a gas laser. Because such fans are inherently magnetically driven devices requiring a DC or AC motor, they have a significant overall size and power consumption. They may also generate significant electromagnetic interference (EMI) and radio frequency interference (RFI) noise signals and are, typically, also a source of audible noise.

SUMMARY OF THE INVENTION

The foregoing problems are overcome and other advantages are realized, in accordance with the apparatus and method of the invention, by one or more solid state piezoelectric fans provided within a flow duct of a gas laser, the fan or fans circulating the laser gas medium.

In accrodance with a preferred embodiment of the invention, a piezoelectric fan is comprised of two counter-oscillating flexible blades that are driven at resonance by a bimorph comprised of two piezoceramic bending elements. The fan is provided within the flow duct of a circulating gas laser. The operation of the piezoelectric fan serves to create a flow of a laser gas medium in a desired direction through the flow duct, thereby replenishing the gas medium between a pair of laser electrodes. Inasmuch as the piezoelectric fan has no wearing elements, such as bearings, and hence, requires no bearing lubricant, the laser gas medium is not contaminated by the operation of the fan.

Furthermore, due to the reduced energy consumption of such a piezoelectric fan relative to a rotary fan, and also due to the small size of such a fan, a reduction in the overall package size of the gas laser may therefore be achieved.

BRIEF DESCRIPTION OF THE DRAWINGS

These and other features of the present invention will be more fully set forth in the detailed description of the invention which follows taken in conjunction with the accompanying drawing; wherein.

DETAILED DESCRIPTION OF THE INVENTION

Figure 1:
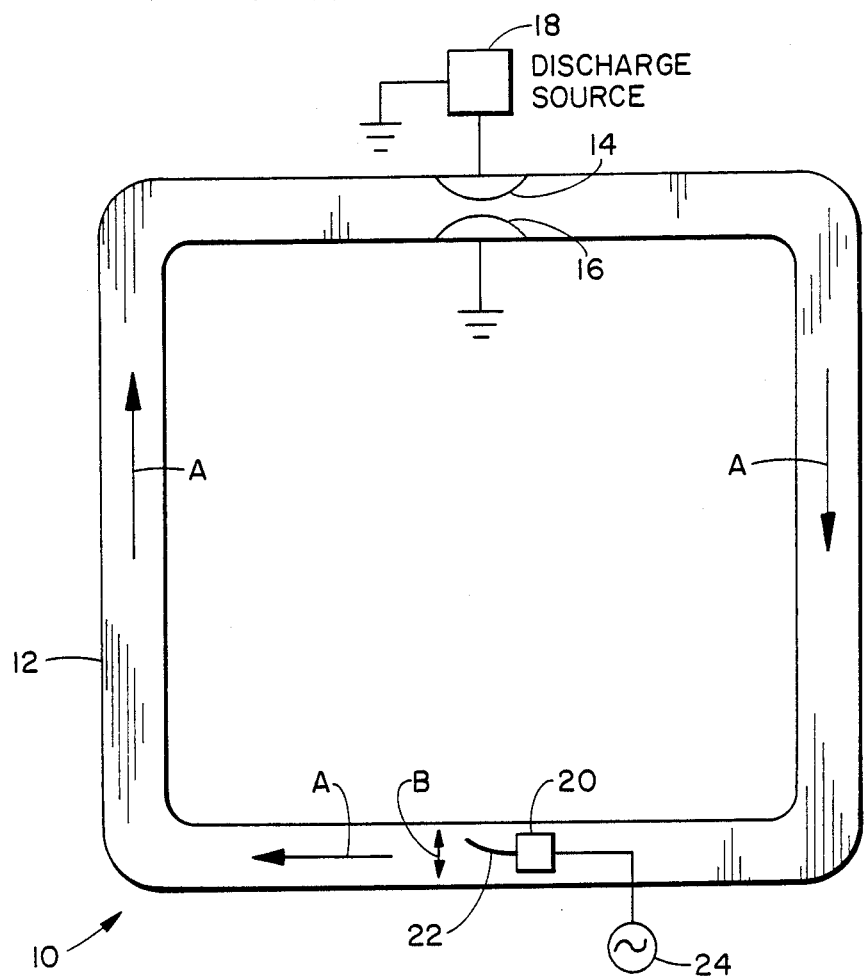
FIG. 1 is a cutaway view, partially in block diagram form, showing a piezoelectric fan disposed within a flow duct of a circulating gas laser.

Referring now to FIG. 1 there is shown a representative gas laser 10 which comprises a gas flow duct 12 through which an active laser gas medium, such as carbon dioxide, circulates within the laser 10. The gas within the flow duct may also comprise a fill, or inert, gas medium. In the laser 10 of FIG. 1 the gas can be seen to flow in a clockwise direction as indicated by the arrows A. Provided within the laser 10 are a first and a second electrode 14 and 16, respectively, which are coupled to a source 18 of discharge energy. When operated in a pulsed mode of operation the source 18 provides a pulse of, for example, high voltage which, in conjunction with electrodes 14 and 16, generates an electrical field between electrodes 14 and 16. This electrical field induces the lasing of the active gas medium as it passes between the electrodes. The resulting pulse of laser radiation is coupled out of the laser 10 by suitable means (not shown) to provide a pulse of laser energy. The discharge source 18 may also be an RF source or any suitable source operable for inducing the lasing of the gas medium.

As can be appreciated, in order for each successive pulse of laser radiation to have characteristics which are similar to other pulses, it is necessary to replenish the lasant gas medium between each pulse. Due to the gas flow within the flow duct 12, the lasant gas medium within the region between electrodes 14 and 16 is replaced, or replenished, between each successive pulse, while simultaneously conveying the gas medium from the previous pulse to other regions of the laser (not shown) where the molecules of the lasant gas may be allowed to relax and recombine such as by the action of a suitable catalyst (not shown). The composition and density of the lasant gas medium is an important factor in the quality and reproducability of each laser pulse. Therefore, it can also be appreciated that the introduction of contaminants into the laser gas medium, such as hydrocarbon contaminants arising from bearing lubricants or bearing particulate matter, will adversely affect the operation of the laser 10.

In accordance with the present invention, the gas medium is caused to flow through the flow duct 12 by the action of a piezo bimorph fan 20, the fan having one or more flexible fan blades 22. The source of excitation energy for the fan 20 is an electrical source 24 which may have sinusoidal power characteristics. The fan 20, when suitably energized by the source 24, causes the fan blade 22 to oscillate in an up and down manner as indicated by the arrow B, thereby providing for a flow of the laser gas medium in the direction indicated by the arrows A.

Figure 2:
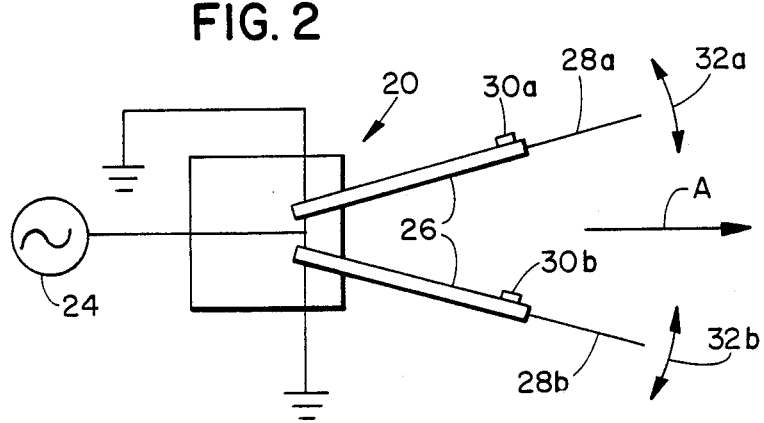
FIG. 2 is a partially schematic view of a piezoelectric fan which is operable for practicing the teaching of the present invention.

Referring now to FIG. 2 there is shown in greater detail the construction of the fan 20. As can be seen, the fan 20 is comprised of a piezoelectric bimorph 26, having first and second elements 26a and 26b, respectively. Each element of the bimorph has attached thereto a flexible fan blade 28a and 28b, respectively. The blades may be attached to the bimorph elements by any suitable attachment means such as by set screws 30a and 30b. The blades may also be attached by a suitable collar means, or by an adhesive means such as by epoxy. Coupled to the bimorph elements 26a and 26b is the source 24 which, as has been stated, is an essentially sinusoidal source. Due to the electromechanical nature of the bimorph 26, the fan is essentially a voltage driven, electrostatically powered device, as opposed to a current driven, magnetically powered device as is typical of most rotating fans.

In operation, the fan blades 28 are driven at resonance by the bimorph elements 26, which typically comprise one or more piezoceramic bending elements which are clamped together at one end to provide a cantilevered type of structure. The bimorph elements 26, when energized by source 24, alternately experience a physical contraction and expansion. The elements 26 move in quadrature with the excitation source, the trailing edges lagging the leading edges by 90 degrees of phase angle. The resulting motion of each of the attached flexible blades 28a and 28b are shown by the arrows 32a and 32b. The result of this oscillatory motion is to produce a flow of the gaseous medium within the laser 10 in the direction shown by the arrows A. This flow is generated by the motion reversal of the blades 32 as they oscillate. Each such motion reversal results in the shedding of a vortex of the gas medium from each of the blades, the vortex having a rotational velocity which is too high to permit the vortex to follow the blade.

One piezoelectric fan which is suitable for use in realizing the present invention is a Module B type fan which is manufactured by Piezo Electric Products, Inc. of Cambridge, MA. The Module B is characterized by two counter-oscillating mylar fan blades which are attached to two piezoceramic bending elements. The fan is powered by either 60 Hertz, 115 volt line voltage or, by 50 Hertz, 220 volt line voltage.

In general, the frequency of the oscillation of the fan blade depends upon the magnitude of the input voltage and also upon the length and stiffness of the fan blade 28. Thus, the frequency of oscillation, and the gas flow characteristics, may be tuned by varying the length and stiffness of the fan blade 28. The particular length and stiffness of a given fan blade may best be determined in an empirical manner based upon such factors as the gas pressure within the flow duct, the geometry of the duct, the pulse repetition rate of the laser, the number of fans to be employed and other such application-specific factors. The fan blade material is selected such that the material is substantially immune to physical degradation resulting from the laser gas medium which is in contact with the blade material.

Inasmuch as the piezoelectric bimorph 26 is a solid state device requiring no bearings nor bearing lubricants, the use of the fan within the sealed laser 10 does not introduce any contamination into the lasant gas medium due to hydrocarbon-based bearing lubricants. The elimination of bearings further provides for a simple mechanical structure which has a useable lifetime which is greatly in excess of rotating fan devices. Furthermore, the energy consumption of such a piezoelectric fan is much less than the energy consumption of a comparable rotary fan, the reduction in energy consumption being as much as 90 percent. Also, there is a relatively low magnetic and acoustic noise associated with the use of such a fan. One further advantage of such a piezoelectric fan is that the fan is essentially an instant starting device which induces no surge in the fan power source due to the starting of the fan.

As can be appreciated, a sealed gas laser incorporating one or more piezoelectric fans to recirculate the gas medium may be stored indefinitely prior to use without causing any contamination of the gas medium due to the evaporation of a bearing lubricant. Furthermore, the reduction in the fan power requirement results in an overall reduction in the required power for the laser system and, the small size of the fan further permits a reduction in the overall package size of the laser system. Also, inasmuch as the fan is an electrostatically powered device, as opposed to a magnetically powered device, there is little or no EMI or RFI generated by the fan during use. The elimination of these interference noise signals may be an important consideration if the laser is to be operated in conjunction with or adjacent to sensitive electronic components which may be distributed by such interference.

It should be realized that the above described embodiment of the invention is illlustrative only and is not meant to limit the scope of the invention to the embodiment or embodiments disclosed herein. Instead, the scope of the present invention is to be limited only as defined by the appended claims.

What is claimed is:

1. A gas laser comprising:
   a first electrode and a second electrode being spaced apart one from the other for defining a discharge region therebetween;
   a source of electrode discharge energy operatively coupled to said electrodes for generating an electrical field within said discharge region;
   a lasant gas medium operable for interacting with the electrical field for generating laser radiation; and
   means for replenishing said gas medium within said discharge region, said replenishing means comprising:
   a piezoelectrically driven fan comprising a bimorph operatively coupled to a source of electrical power for inducing an oscillatory motion in said bimorph, said fan further comprising a fan blade means coupled to said bimorph and moved thereby such that said gas medium is caused to flow through said discharge region whereby said gas medium is replenished within said discharge region.

2. A laser as defined in claim 1 wherein said bimorph further comprises:
   at least one bimorph element coupled at one end thereof to said source, said element further having a flexible fan blade coupled to an opposite end thereof.

3. A laser as defined in claim 2 wherein said bimorph element is comprised of a piezoceramic material.

4. A laser as defined in claim 3 wherein said flexible fan blade is comprised of a material having characteristics which resist degradation of the material due to exposure to the lasant gas medium.

5. A laser as defined in claim 4 wherein the material comprises mylar.

6. A laser as defined in claim 1 wherein said replenishing means further comprises a plurality of said piezoelectrically driven fans.

7. A method of replenishing the lasant gas medium within a discharge region of a gas laser, comprising the steps of:
   providing a flow duct being operable for containing the gas medium therein, the flow duct further being operable for directing the gas medium to the discharge region;
   providing one or more piezoelectrically driven fans within the flow duct; and
   energizing the fan or fans such that the gas medium is caused to flow through the duct whereby the gas medium is directed to the discharge region for replenishing the gas medium within the discharge region.

8. A method as defined in claim 7 wherein each of the fans comprises a flexible blade means and wherein the step of energizing causes the blade means to move with an oscillatory motion having a predetermined frequency.

9. A method as defined in claim 8 wherein the step of providing one or more piezoelectrically driven fans further comprises a step of determining the lenght and the stiffness of the flexible blade means such that the predetermined frequency is operable for providing a desired gas medium replenishment rate.

* * * * *